March 30, 1926.
C. V. ZOUL
1,579,171
PROCESS OF FILTRATION AND TREATMENT OF LIQUIDS
Filed Feb. 13, 1923
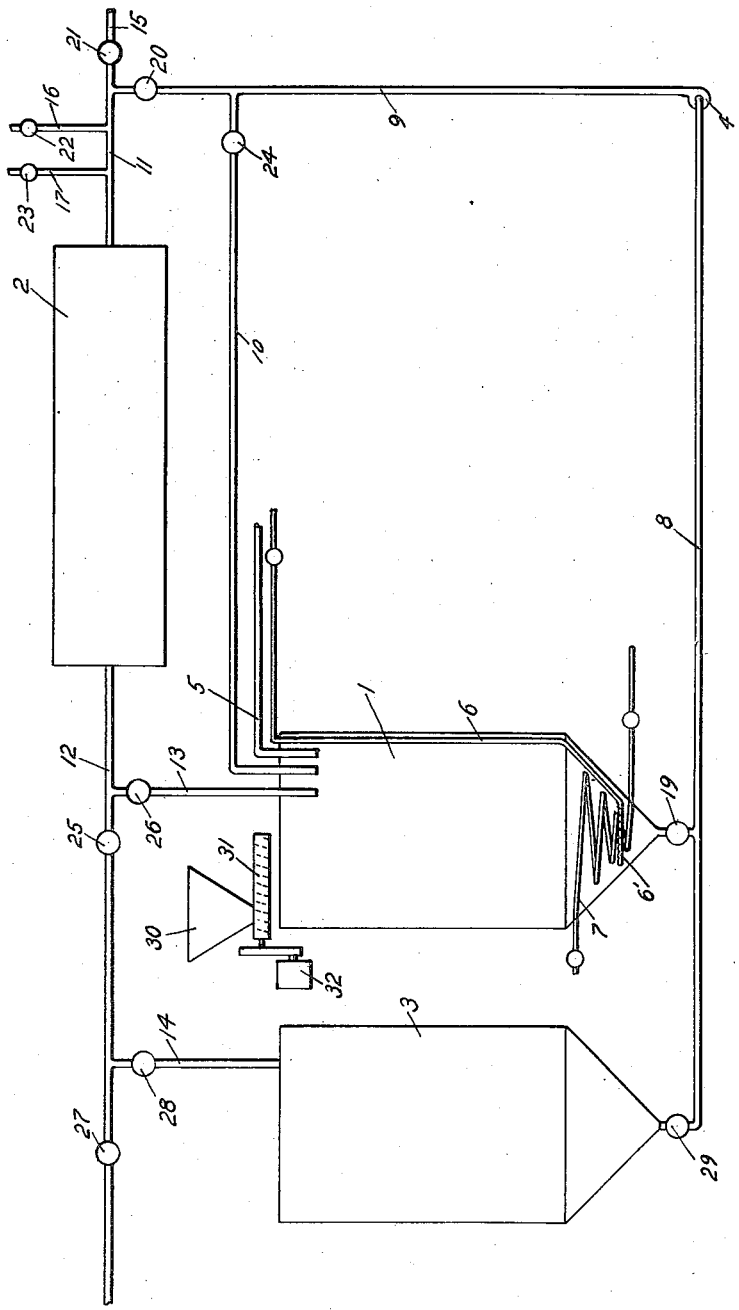
INVENTOR.
Charles V. Zoul
BY Arthur P. Knight
ATTORNEY.

Patented Mar. 30, 1926.

1,579,171

UNITED STATES PATENT OFFICE.

CHARLES V. ZOUL, OF SANTA MONICA, CALIFORNIA, ASSIGNOR TO THE CELITE COMPANY, OF LOS ANGELES, CALIFORNIA, A CORPORATION OF DELAWARE.

PROCESS OF FILTRATION AND TREATMENT OF LIQUIDS.

Application filed February 13, 1923. Serial No. 618,803.

*To all whom it may concern:*

Be it known that I, CHARLES V. ZOUL, a citizen of the United States, residing at Santa Monica, in the county of Los Angeles and State of California, have invented a new and useful Process of Filtration and Treatment of Liquids, of which the following is a specification.

This invention relates to an improved process of treating various liquids or solutions, such as sugar solutions occurring in the refining of cane and beet sugar, syrups, molasses, etc., vegetable, mineral, animal and marine oils or emulsions; chemical solutions and all other solutions benefited by such treatment in industrial operations. In such filtration or treating operations it is usual to employ a so called filter aid which is mixed with the liquid to be filtered and then passed through a filter press, the filter-aid being retained on the filter medium together with all impurities contained in the liquid. The filter-aid serves to provide for the removal of the impurities, promoting clarity of the filtrate, preventing clogging of the filter mediums by slimy or finely divided material present in the liquid and maintaining effective filtration. The filter-aid may also, in some cases, act as a de-emulsifying agent, for example, for emulsions of petroleum and water. The filtrate from such operation does not become brilliant until a coating has been formed on the filtering surfaces and the turbid filtrate must therefore be re-filtered. My invention insures perfect clarity or filtration from the very start.

The main object of the present invention is to provide for the treatment of liquids, solutions or emulsions and their clarification or de-emulsification in a rapid and economical manner. This object is obtained by the use of a filter-aid in a preliminary operation in which a coating of filter-aid is built up on the filtering mediums of the filter press and then passing the liquid to be treated through the filter press.

The accompanying drawing is a flow sheet illustrating a suitable apparatus for carrying out the invention. Referring to said drawing, I have indicated at 1 a pre-coating tank or suitable receptacle of a cubical volume, preferably 10-50% greater than that of the filter presses used in a connection, said tank being provided with suitable means 5 for supplying thereto a body of suitable liquid, means 6 for blowing air through a perforated coil 6' and through the body of the liquid, and means 7 consisting of a steam coil to heat the liquid if desirable. An outlet pipe 8 leads from tank 1 through suitable pump 4 for forcing the liquid through pipes 9 and 11 through the filter press 2 of any suitable type. The filter press 2 may be provided with means 15 for supplying the main body of liquor to be treated to the filter press, and with means as indicated at 16 and 17 for supplying steam and air thereto so as to provide for either blowing with steam or air, or both, through the filter press for warming or drying purposes.

The discharge or outlet 12 from the filter press 2 has a branch line 13 leading back to tank 1 and another branch line 14 leading to an extra tank 3. The use of line 14 and tank 3 may be eliminated in some instances as will be explained later. An outlet pipe from tank 3 joins pipe 8 and thereby connects with the pump 4. The discharge 12 from the filter press 2 also leads to a storage tank (not shown) or provides a means of conducting the treated liquid to suitable apparatus, in case further treatment is desirable. Suitable valves 19, 20, 21, 22, 23, 24, 25, 26, 27, 28, 29 are provided to regulate the flow of liquid in the various pipe lines.

Means for introducing the filter-aid into the liquid may be provided as shown, comprising a hopper 30 provided at its lower extremity with a screw conveyor 31 driven through suitable gearing or belting by motor 32.

The addition of the filter-aid does not necessarily have to be made by means of the apparatus described above, as any mechanical or manual means of gradually adding the filter-aid will accomplish the same object. In no case, however, should all of the filter-aid be thrown into the pre-coating tank at the same time but always only in small increments of the whole amount. In some industrial operations, the filter-aid or a combination of filter-aids may be made into a thick slurry and then fed in small amounts into the pre-coating liquid in this form, either singly, in combination, or successively.

The filter aid used in my process may consist of diatomaceous earth, whether raw, calcined, or otherwise treated, wood pulps, asbestos or bagasse fibre, cotton waste, mineral or glass wool, or fuller's earth, bleaching clays, carbons, etc., or any combination of these materials, as for instance, of diatomaceous earth and pulp or diatomaceous earth and carbons or bleaching clays or decolorizing agents.

Any suitable fluid, depending upon the liquid being treated, may be used for pre-coating. Ordinarily, the filtered liquid is used, although in treatment of emulsions, either one of the constituents of the emulsion may be used for pre-coating, depending upon the conditions present. The described process is applicable and of great value to all industries where filtration, clarification or dehydration form a part of the process; that is, in sugar juice, fruit juice or syrup clarification; in filtration of chemical solutions, etc., and dehydration of oils and fats. The described process prepares a filter press so that efficient filtration is effected from the beginning of the filtration operation with the liquid to be treated, and will thoroughly remove all gummy and sticky substances no matter how finely divided which interfere with or retard filtration, and, as in the case of sugar solutions, interfere with subsequent crystallization.

My process may be carried out in the above described apparatus in the following manner, assuming that it is to be applied to the clarification of sugar solutions in the refining of sugar:

In the present state of the art, raw sugar is mixed with syrup in a mingler and purged in a centrifugal, a separation being effected between washed sugar and the washings, which are subsequently treated separately. The washed sugar is then sent to a melter and dissolved in sweet water or sugar filtrates from other parts of the process. This washed sugar syrup is the liquid which may be treated by the present invention, and will be supplied to the apparatus described above through the means 15. Sweet water or filtrate obtained by washing press cake in a separate operation is allowed to flow into the tank 1 through means 5 provided therefor, although any suitable liquid may be used and raised to the desired temperature, usually about 180° F. by regulating the steam coil 7. Valves 19, 20, and 26 are then opened and the pump 4 utilized in circulating the liquid by means of lines 8, 9, 11, 12 and 13 through the clean filter press 2 and back into tank 1. This operation is important in that it removes all air or retarding impurities present in the filter press cells, cloths and interstices and where necessary warms up the press.

A definite amount of filter-aid necessary to produce a coating of the desired thickness on the surface of the filtering medium is then placed in the hopper 30 and motor 32 started so as to cause the filter-aid to be fed into tank 1 in a continuous manner by means of the screw conveyor 31, without discontinuing circulation. The air agitation coil is also opened to thoroughly agitate and cause the filter-aid to go into suspension, and the circulation continued by means of the pump 4 through the filter press and back into the tank 1 so that tht filter-aid is slowly but continuously deposited upon the filtering surfaces of the press, by repeated circulation of the pre-coating liquid and gradual addition of filter-aid during such circulation.

The operations comprising the addition of filter-aid, agitation and circulation through the press, are continued until all filter-aid has been added and deposited upon the filter surfaces in the form of an even coating. The pre-coating liquid is then discharged from the filter press into tank 3 through lines 12 and 14 by gradually closing valve 26 and opening valve 28. The washed sugar syrup to be treated is usually agitated and heated to about 180° F. in a tank commonly known in the art as the "blow up" and an amount of filter-aid added to the liquid therein together with any lime or other chemicals that may be necessary.

When practically all liquid in tank 1 has been transferred to tank 3, and a coating or precoat of filter-aid or filtering agent formed on the filtering surfaces of the filter press 2, valve 21 is gradually opened and valves 20 and 28 closed admitting the washed sugar syrup to filter press 2 and discharging through line 12 to apparatus for further treatment, which in this operation generally consist of char filters to further refine the sugar before crystallization.

The rate at which the filter-aid is added to the pre-coating liquid depends upon the size of the press, the thickness of the bed of filter-aid which it is desired to build up, the character of the liquid being treated, the rate of flow and other operating factors. The time necessary to form the precoat may vary from a few minutes to an hour or more, depending upon the above factors. During the pre-coating operation it is desirable to regulate the circulation through the press in such manner as to give open and rapid flow. This is very desirable in view of the fact that a rate of flow greater than the gravitational effect on the suspended filter-aid shall effectively prevent the liquid from being retarded or from standing in the press cells or spaces, thereby effectively preventing any classification, settling or segregation of particles of filter-aid which results in uneven heterogeneous cake formation and thereby impairs the efficiency of the filtration operation.

A further example of my process is illustrated in the filtration of oils and fats of any type for either filtration, purification, bleaching or dehydration. By dehydration is meant absorption of water entirely or breaking emulsion in such a manner that the water will settle out after treatment. In the case of petroleum emulsions, a quantity of dry or nearly dry oil slightly greater in volume than the volumetric capacity of the press and pipe lines, is admitted into the pre-coating tank. Heat is supplied to this oil by means of closed steam lines and the pump 4 utilized to convey the oil through the press and discharge back into the tank. This circulation is continued until all air in the press has been displaced with oil, and until all parts of the system reach the desired temperature of filtration. The continuous flow of the filter-aid, such as diatomaceous earth, is then started into the precoating tank, the circulation of dry oil carrying such filter-aid into the press and depositing same upon the filtering surfaces of the press. The rate of flow of filter-aid into the pre-coating tank is regulated in such a manner as to keep the percentage of filter-aid in suspension in the pre-coating oil below such concentration as would retard or impair the rapid flow of the pre-coating oil. The period of time consumed in the flow of filter-aid to the pre-coating oil may be extended so as to obtain the most effective bed of filter-aid for the subsequent operations. At the end of such period of time, all or part of the flow of the press may be diverted into the extra tank 3, this operation placing all of the filter-aid upon the cloths of the filter press. At this point of the process, the valve 20 is gradually closed and valve 21 is gradually opened in such manner as not to effect a change in pressure due to change in liquid. The main liquid or emulsified oil is then continually fed into the press as is commonly done in any filtering operation, the discharge from the press being sent to a settling tank in which a clean separation between oil and water is obtained. The settling operation may also be carried out in other forms of apparatus. In this operation, the use of an additional amount of filter-aid in the emulsified oil is usually not necessary.

Pipe line 10 and valve 24 may be used to regulate the initial circulation in the pre-coating process by by-passing a portion of the pre-coating or circulating oil if the initial flow through the press is too great. This by-pass flow also serves to thoroughly mix the suspension in the pre-coating tank.

If at any time during the filtering, dehydrating or clarifying operation, it is desirable to fortify or reinforce the pre-coat of filter-aid upon the filtering surfaces of the filtering medium, an additional pre-coat may be built up by circulating a clean liquid through the press as described above, after closing the valve 21 and opening valve 20. A sufficient amount of a clean liquid should be allowed to pass through the press and lines to displace all of the main liquid left in the press, and then the pre-coating operation substantially as above described should be repeated.

The thickness of the pre-coat on the filtering surfaces will necessarily vary with the demands of the operation. As an example, four to five ounces of diatomaceous earth, known as filter-cel, per square foot of filtering surface is sufficient to form a pre-coat of about $\frac{3}{16}$ inch in thickness. It is to be remembered that the pressures used during the pre-coating and filtering operation have a great bearing upon the thickness of the pre-coat formed. It is usually desirable to use comparatively low pressures in forming the precoat, although it is not limited to low pressures.

It will be seen that in the above described processes of preparing a filter press for filtration or de-emulsification, a clean liquid is first repeatedly circulated through the press to displace air therefrom, such liquid being warmed if desired so as to warm the press at the same time, and a finely divided filter-aid or de-emulsifying agent such as diatomaceous earth is then gradually added to the liquid while circulation thereof through the press is maintained, with the result that a precoat of such finely divided material is gradually formed on the filtering surfaces. The liquid is thus used over and over again in this operation, effecting a very great saving in the amount of liquid which it is necessary to use for this purpose.

While no exact proportions of filter aid and liquid can be stated, because of the variant conditions above noted, the following is one typical example of my process: Assuming a filter press of 300 sq. ft. filtering surface and a volumetric capacity of about 15 cubic feet, and 100 gallons of precoating liquid in the precoating tank; the liquid is circulated from the tank through such press and returned back into the precoating tank. During this repeated circulation of the pre-coating liquid the filtering material may be added thereto at a rate of approximately two pounds per minute, so that the total quantity (94 pounds) of filter aid required to form a coating of about $\frac{3}{16}$ of an inch in thickness on the filter surfaces will be applied in about 47 minutes; the rate of flow of the precoating liquid during such pre-coating operation being about thirty gallons per minute; and the amount of filter aid dispersed in the precoating liquid being approximately two pounds to every thirty gallons of liquid.

The prepared filtering surface resulting from the operation of my process differs from precoated filtering surfaces prepared heretofore, in the following manner. Precoating heretofore has been carried out by adding all of the filter aid or filtering material, which it was desired to use, at one time to a body of liquid and passing this mixture only once through the filtering apparatus. In this old method the mixture used was a thick suspension of filter aid and liquid and the coating produced on the filtering surface was irregular, and offered varying resistances at different parts of the prepared filtering surface to the flow of liquid. In this old method settling of the filter aid in the chambers or cavities of the filtering apparatus occurred frequently thereby blocking or rendering ineffective parts of the filtering apparatus.

Furthermore, in order to form a uniform precoat of a certain desired thickness on the filtering surfaces of a filtering apparatus of a given size, it is necessary to use a definite quantity of filter aid; and in the old method a sufficient quantity of precoating liquid had to be used to form a sufficiently fluid suspension of all the filter aid to permit passage thereof through pipe lines, pumps, etc. By my method, on the other hand, a comparatively small quantity of precoating liquid is circulated repeatedly through the filtering apparatus, each time with a small portion of the filter aid suspended therein, additional filter aid being added during the repeated circulation thereof so that only a minimum amount of precoating liquid is required in my process to deposit on the filtering surfaces the required thickness of filter aid.

By forming a coating of filter aid by my process, the mixture of liquid and filter aid is only a very thin suspension, and the rate of flow obtained during precoating is usually greater than that obtainable by the old method. Settling of the filter aid does not occur, and the coatings formed on the filtering surfaces are very even, giving a much more effective filtration and equal resistance at all parts of the filtering surface.

What I claim is:

1. The process of filtration comprising repeatedly circulating clean liquid through a filtering apparatus, followed by a gradual addition of a filter aid to the circulating liquid; so as to form a bed of filter aid upon the filtering surfaces of the filtering apparatus previous to passage therethrough of the solution to be treated.

2. The process of filtration comprising repeatedly circulating clean liquid through a filtering apparatus, followed by a gradual addition of diatomaceous earth to the circulating liquid; so as to form a bed of diatomaceous earth upon the filtering surfaces of the filtering apparatus previous to the passage therethrough of the liquid to be treated.

3. A process of filtration comprising repeatedly circulating clean liquid through a filtering apparatus, and then continuing to circulate liquid through the filtering apparatus while gradually adding a filter aid and decolorizing agent to the liquid; so as to form a bed of filter aid and decolorizing agent upon the filtering surfaces of the filtering apparatus previous to the passage therethrough of the liquid to be treated.

4. A process of filtration comprising repeatedly circulating a liquid through the filtering apparatus, continuing such circulation while gradually adding filter-aid to the liquid during circulation, to form an even coating of filter-aid upon the filtering surfaces of the filtering apparatus by a continued and repeated circulation, and subsequently passing the liquid to be treated through such coating of filter-aid.

5. In a process of filtration as outlined in claim 4, the admixture of an additional amount of filter-aid to the liquid to be treated previous to its passage through the coating of filter-aid.

6. In a process of filtration as outlined in claim 4, the admixture of a decolorizing agent to the liquid to be treated previous to its passage through the coating of filter-aid.

7. In a filtration operation as set forth in claim 4, the further process which consists in interrupting the passage of liquid being treated, the displacement of such liquid in the filtering apparatus by a precoating liquid, repeatedly circulating precoating liquid through the filtering apparatus, the gradual addition of diatomaceous earth to the precoating liquid during circulation, the formation of an even coating of diatomaceous earth upon the filtering surfaces of the filtering apparatus by the repeated circulation and the subsequent passage of the liquid to be treated through such coating of diatomaceous earth.

8. In a filtration process or operation as set forth in claim 4, the further step which consists in interrupting the passage of liquid being treated, removing such liquid from the filtering apparatus, replacing all air in the filtering apparatus with a precoating liquid, repeatedly circulating precoating liquid through the filtering apparatus, gradually adding a filter-aid to the precoating liquid during circulation, forming an even coating of filter-aid upon the filtering surfaces by repeated circulation, and subsequently passing the liquid to be treated through such coating of filter-aid.

9. A process of filtration comprising repeatedly circulating a liquid through the filtering apparatus, continuing such circulation while gradually adding diatomaceous earth to the liquid during circulation so as to form an even coating of diatomaceous earth upon the filtering surfaces of the filtering apparatus by a continued circulation, and subsequent passage of the liquid to be treated through such coating of diatomaceous earth.

10. In a process of filtration as set forth in claim 9, the admixture of an additional amount of diatomaceous earth to the liquid to be treated previous to its passage through the coating of diatomaceous earth.

11. The process of treating emulsions of oil and water comprising repeatedly circulating oil through a filtering apparatus, the gradual addition of a finely divided solid de-emulsifying agent to the oil during the repeated circulation, so as to form an even coating of de-emulsifying agent upon the filtering surfaces of the filtering apparatus by the continued and repeated circulation; and discontinuing the oil circulation and passing the emulsified liquid to be treated through such coating of de-emulsifying agent.

12. The herein described process of precoating a filter; consisting in repeatedly circulating a liquid through the filter in a closed circuit; gradually disseminating a filter-aid in the liquid, during said circulation thereof; and continuing such circulation of the liquid until a precoat of the filter-aid of the desired thickness is formed upon the filter surface.

13. The herein described filtering process; consisting in repeatedly circulating a liquid through a filter in a closed circuit; disseminating a filter-aid in the liquid during the circulation thereof; continuing the circulation of the liquid until a precoat of filter-aid of the desired thickness has been formed upon the filter surface; passing a mixture or emulsion to be filtered through the precoated filter; interrupting the filtering operation; forcing a cleaning fluid through the precoated filter; recirculating the liquid containing filter-aid in suspension through the filter to form a secondary precoat on the precoated filtering surface; and finally resuming filtration of the mixture or emulsion.

14. The herein described process of precoating a filter; consisting in repeatedly circulating a liquid through the filter in a closed circuit; disseminating a filter-aid in the liquid, during the circulation thereof, by successively adding thereto increments of the whole amount of filter aid to be used in forming the precoat; and continuing the circulation of the liquid until a precoat of the filter-aid of the desired thickness is formed upon the filter surface.

In testimony whereof I have hereunto subscribed my name this 8th day of February, 1923.

CHARLES V. ZOUL.